United States Patent
Blumrich

(10) Patent No.: US 11,619,142 B2
(45) Date of Patent: Apr. 4, 2023

(54) DEVICE HAVING AT LEAST TWO COMPONENTS, AND GAS TURBINE ENGINE HAVING SUCH A DEVICE

(71) Applicant: Rolls-Royce Deutschland Ltd & Co KG, Blankenfelde-Mahlow (DE)

(72) Inventor: Markus Blumrich, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 17/499,417

(22) Filed: Oct. 12, 2021

(65) Prior Publication Data
US 2022/0120195 A1   Apr. 21, 2022

(30) Foreign Application Priority Data

Oct. 21, 2020  (DE) ............... 10 2020 127 710.5

(51) Int. Cl.
*F01D 25/18*  (2006.01)
(52) U.S. Cl.
CPC ........ *F01D 25/183* (2013.01); *F05D 2220/32* (2013.01)
(58) Field of Classification Search
CPC ..................... F01D 25/183; F05D 2220/32
See application file for complete search history.

(56) References Cited

U.S. PATENT DOCUMENTS

| | | | |
|---|---|---|---|
| 3,486,760 A * | 12/1969 | Tracy ............ | F16J 15/342 277/401 |
| 3,675,935 A * | 7/1972 | Ludwig .......... | F16J 15/342 277/400 |
| 3,782,737 A * | 1/1974 | Ludwig .......... | F16J 15/342 277/400 |

(Continued)

FOREIGN PATENT DOCUMENTS

| | | |
|---|---|---|
| EP | 2604802 A1 | 6/2013 |
| EP | 3748129 A1 | 12/2020 |

OTHER PUBLICATIONS

German Search Report dated May 18, 2021 from counterpart German Patent Application No. 10 2020 127 710.5.

*Primary Examiner* — Igor Kershteyn
*Assistant Examiner* — Theodore C Ribadeneyra
(74) *Attorney, Agent, or Firm* — Shuttleworth & Ingersoll, PLC; Timothy Klima

(57) ABSTRACT

A device has two components that delimit a space containing oil. A rotationally fixed component is moved axially to press against an axial sealing surface of a rotatable component by an actuating force to seal the space in a region of another axial sealing surface. An air flow between the two sealing surfaces results in a further actuating force, acting on the fixed component in the axial direction to counteract the actuating force and move the fixed component away from the rotatable component once a defined speed of rotation of the rotatable component is reached. The rotatable component and the fixed component are supplied with oil close to (Continued)

the sealing surfaces. In the installed position of the fixed component, oil is passed from an upper region of the fixed component in the circumferential direction of the fixed component in the direction of a lower region of the fixed component.

12 Claims, 3 Drawing Sheets

(56) References Cited

U.S. PATENT DOCUMENTS

| | | | | |
|---|---|---|---|---|
| 3,804,424 A * | 4/1974 | Gardner | F16J 15/3412 | 277/400 |
| 4,099,729 A * | 7/1978 | Nylykke | F16C 33/107 | 277/400 |
| 4,196,911 A * | 4/1980 | Matsushita | F16J 15/342 | 277/408 |
| 4,212,475 A * | 7/1980 | Sedy | F16J 15/3412 | 277/400 |
| 4,749,199 A | 6/1988 | Gresh | | |
| 4,768,790 A * | 9/1988 | Netzel | F16J 15/3464 | 277/377 |
| 4,776,261 A * | 10/1988 | Larson | F16J 15/40 | 277/459 |
| 4,889,348 A * | 12/1989 | Amundson | F16J 15/3412 | 277/306 |
| 4,928,978 A * | 5/1990 | Shaffer | F16J 15/162 | 277/401 |
| 5,039,113 A * | 8/1991 | Gardner | F16J 15/3412 | 277/408 |
| 5,172,918 A * | 12/1992 | Pecht | F01D 11/003 | 277/400 |
| 5,217,233 A * | 6/1993 | Pecht | F16J 15/3412 | 277/306 |
| 5,224,714 A * | 7/1993 | Kimura | F16J 15/3412 | 277/400 |
| 5,253,876 A * | 10/1993 | Gardner | F16J 15/3404 | 277/408 |
| 5,375,853 A * | 12/1994 | Wasser | F16J 15/3404 | 277/408 |
| 5,385,409 A * | 1/1995 | Ide | F16J 15/3432 | 384/138 |
| 5,399,024 A * | 3/1995 | Shapiro | F16J 15/3432 | 277/400 |
| 5,454,572 A * | 10/1995 | Pospisil | F16J 15/3412 | 277/408 |
| 5,490,679 A * | 2/1996 | Borrino | F16J 15/3472 | 277/369 |
| 5,492,341 A * | 2/1996 | Pecht | F16J 15/3412 | 384/123 |
| 5,496,047 A * | 3/1996 | Goldswain | F16J 15/3412 | 277/400 |
| 5,529,315 A * | 6/1996 | Borrino | F16J 15/004 | 277/927 |
| 5,558,341 A * | 9/1996 | McNickle | F16J 15/3488 | 277/400 |
| 5,658,127 A * | 8/1997 | Bond | F16J 15/3404 | 415/230 |
| 5,722,665 A * | 3/1998 | Sedy | F16J 15/3412 | 277/400 |
| 5,941,532 A | 8/1999 | Flaherty et al. | | |
| 6,059,293 A * | 5/2000 | Azibert | F16J 15/3488 | 277/358 |
| 6,068,264 A * | 5/2000 | Azibert | F16J 15/3488 | 277/408 |
| 6,098,753 A * | 8/2000 | Lamarre | F01D 25/183 | 277/579 |
| 6,135,458 A * | 10/2000 | Fuse | F16J 15/342 | 277/400 |
| 6,257,589 B1 * | 7/2001 | Flaherty | F16J 15/3412 | 277/400 |
| 6,431,551 B1 * | 8/2002 | Fuse | F16J 15/342 | 277/390 |
| 6,505,836 B1 * | 1/2003 | Toshihiko | F16J 15/342 | 277/411 |
| 7,066,469 B2 * | 6/2006 | Stephens | F16J 15/3404 | 277/359 |
| 7,726,659 B2 * | 6/2010 | Fujiwara | F16J 15/3448 | 277/408 |
| 7,780,399 B1 * | 8/2010 | Garrison | F01D 25/183 | 277/400 |
| 7,883,093 B2 * | 2/2011 | Ueda | B29B 7/58 | 277/408 |
| 8,474,826 B2 * | 7/2013 | Villeneuve | F16J 15/3444 | 277/377 |
| 9,039,013 B2 * | 5/2015 | Artiles | F16J 15/3412 | 277/400 |
| 9,062,775 B2 * | 6/2015 | Short | F16J 15/3412 | |
| 9,482,158 B2 * | 11/2016 | Ullah | F02C 7/28 | |
| 9,574,666 B2 * | 2/2017 | Ferris | F16J 15/3412 | |
| 10,267,421 B2 * | 4/2019 | Ohya | F16J 15/162 | |
| 10,316,974 B2 * | 6/2019 | Webster | F16J 15/40 | |
| 10,337,619 B2 * | 7/2019 | Ruggeri | F16J 15/3412 | |
| 2012/0280458 A1 * | 11/2012 | Artiles | F16J 15/3412 | 277/411 |
| 2014/0203517 A1 * | 7/2014 | Ferris | F16J 15/3412 | 277/400 |
| 2016/0032840 A1 * | 2/2016 | James | F16J 15/342 | 415/170.1 |
| 2016/0208696 A1 * | 7/2016 | Larson | F02C 7/06 | |
| 2017/0016350 A1 * | 1/2017 | Miller | F01D 5/02 | |
| 2017/0268360 A1 * | 9/2017 | De La Bruere Terreault | F16J 15/54 | |
| 2018/0045316 A1 * | 2/2018 | Kovacik | F01D 25/22 | |
| 2019/0257214 A1 * | 8/2019 | Pankratov | F16C 33/768 | |
| 2020/0141281 A1 * | 5/2020 | Ikeguchi | F01D 25/16 | |
| 2020/0182090 A1 * | 6/2020 | Davis | F01D 25/20 | |

* cited by examiner

DEVICE HAVING AT LEAST TWO COMPONENTS, AND GAS TURBINE ENGINE HAVING SUCH A DEVICE

CROSS-REFERENCE TO A RELATED APPLICATION

This application claims priority to German Application No. 10 2020 127 710.5 filed Oct. 21, 2020, which application is incorporated by reference herein.

This application claims priority to German Patent Application DE102020127710.5 filed Oct. 21, 2020, the entirety of which is incorporated by reference herein.

The present disclosure relates to a device having at least two components, which, at least in some region or regions, delimit a space in which oil is present. Furthermore, the present disclosure relates to a gas turbine engine, in particular a gas turbine engine of an aircraft having a device of this kind.

EP 2 604 802 A1 discloses a sealing assembly which is provided for sealing between two components that can be rotated relative to one another. In this case, there is the possibility that just one of the two components is of rotatable design, while the other is connected to a casing in a manner fixed in terms of rotation. In addition, there is also the possibility that both components are of rotatable design and rotate in the same direction of rotation or in different directions of rotation. A rotatable component is also referred to as a rotor, which can be mounted on a rotating part. In addition, the rotor can be produced from a metallic material, for example. The rotationally fixed component is often produced from a self-lubricating material, such as carbon.

The rotor and the rotationally fixed component are embodied with axial sealing surfaces which face one another. During the rotation of the rotor relative to the rotationally fixed component, air enters between the sealing surfaces, with the result that they rise from one another and an air cushion forms between them. This has the effect that the rotationally fixed component and the rotor no longer have any contact in the region of the sealing surfaces as soon as the differential speed of rotation between the sealing surfaces of the rotor and of the stationary element exceeds a threshold. There is then essentially no longer any sliding friction between the sealing surfaces. The gap which is formed in the axial direction between the sealing surfaces is small and effectively prevents the escape of fluid, such as oil or the like, via the seal.

However, it is problematic here that production-related component tolerances may prejudice the contactless sealing operation of a sealing arrangement of this kind. The sealing surfaces then no longer move out of contact to the desired extent. The heat input into the rotor and into the rotationally fixed component in the region of the sealing surfaces is then undesirably high owing to prolonged contact phases between the sealing surfaces. This prolonged heat input can have the effect that operating temperatures of the sealing arrangement reach values which cause carbonization of oil, for example, especially close to the sealing surfaces. The carbonized oil is deposited on the rotor and on the rotationally fixed component, and this may considerably impair the functioning of the sealing arrangement.

It is an object of the present disclosure to make available a device having at least two components, which, at least in some region or regions, delimit a space in which oil is present, by means of which device an escape of oil from the space between the components is avoided in a simple manner and by means of which device undesirably high operating temperatures of the device during the operation of the device are avoided in a manner which is simple in terms of design. Furthermore, it is an underlying object of the present disclosure to provide a gas turbine engine that has a device of this kind.

This object is achieved by means of a device and by means of a gas turbine engine in accordance with the features disclosed herein.

The device according to the present disclosure has at least two components, which, at least in some region or regions, delimit a space in which oil is present. One of the components is embodied in such a way as to be rotatable relative to the other component, which is of rotationally fixed design. The rotationally fixed component can be moved axially relative to the rotatable component and is subjected to an axial actuating force. The axial actuating force acts on the rotationally fixed component, acting in the direction of the rotatable component. The rotationally fixed component is pressed against an axial sealing surface or end face of the rotatable component in an axial direction by the actuating force in order to seal the space in the region of an axial sealing surface or end face. In addition, the rotationally fixed component or the rotatable component, or the rotationally fixed component and the rotatable component, is/are embodied, in the region of the sealing surface thereof, in each case with at least one means. During a rotary motion of the rotatable component relative to the rotationally fixed component, the means produce/s an air flow which is drawn in from the environment of the components, flows through between the sealing surfaces, and is directed into the space.

The air flow can result in a further actuating force, which acts on the rotationally fixed component in the axial direction and counteracts the actuating force. Here there is the possibility that the further actuating force moves the rotationally fixed component away from the rotatable component in the axial direction once a defined speed of rotation of the rotatable component has been reached and that a gap will be formed between the sealing surface of the rotationally fixed component and the sealing surface of the rotatable component.

The rotatable component, the rotationally fixed component, or the rotatable component and the rotationally fixed component, are supplied with oil close to the sealing surfaces of the components. In the installed position of the device, the oil is passed from an upper region of the rotationally fixed component in the circumferential direction of the rotationally fixed component and hence substantially along the outer side of the rotationally fixed component in the direction of a lower region of the rotationally fixed component.

By means of the additional oil cooling of the sealing region between the two components, overheating of the rotationally fixed component and of the rotatable component is avoided in a manner which is simple in terms of design, even if the contactless sealing state between the two components is not achieved for a sufficiently long time on account of component tolerances and the like and owing to unwanted axial relative movements between the rotationally fixed component and the rotatable component.

Thus, the sealing arrangement is tolerant to "rubbing" between the rotatable component and the rotationally fixed component. In the present case, the term "rubbing" is understood to mean the state in which the two axial sealing surfaces of the rotationally fixed component and the rotatable component come into frictional contact with one another.

It has been found that this rubbing is so intense above a certain rotational speed that overheating phenomena occur within short operating times. This results from the fact that the contact speeds rise and, as a result, the heat input increases with increasing rotational speeds or relative speeds of rotation between the two components.

In the device according to the present disclosure, this heat input is dissipated to the desired extent by the oil with which the rotationally fixed component is supplied, thus avoiding unwanted overheating phenomena in a simple manner.

The rotationally fixed component can be designed as a hollow-cylindrical component and, on its outer side, can have at least one groove extending in the circumferential direction. Through the groove, the oil can be passed from the upper region in the direction of the lower region along the outer circumference of the rotationally fixed component and, in the process, can temperature-control or cool the rotationally fixed component to the desired extent.

If the rotationally fixed component is arranged in such a way as to be axially movable in a groove of a further component, and if the oil is passed through the further component into the groove of the rotationally fixed component, it is possible to input oil into the groove to the desired extent.

The actuating force can correspond to a spring force of a spring unit which is arranged in the groove of the further component and comprises at least one spring element. It is a simple matter in terms of design for the spring element to be supported at one end against a shoulder on the rotationally fixed component and at the other end against a shoulder on the further component.

If the oil is passed through a channel in the further component into the groove of the rotationally fixed component, the device is characterized by a smaller number of components for enabling the additional oil cooling in comparison with known solutions.

It is a simple matter in terms of design for the channel to be provided in the further component, extending substantially in the axial direction of the rotatable component, and to be in operative connection with at least one tap hole. The tap hole can emerge in the region of an inner side of the further component. In this case, there is the possibility that the mouth of the tap hole is arranged above the groove of the rotationally fixed component in the installed position of the further component. The oil can then be introduced into the groove to the desired extent. Moreover, the oil then enters the groove from the channel purely on account of the gravitational force acting on the oil.

The further component can be designed with a catcher region, which is arranged below the groove of the rotationally fixed component in the installed position of the rotationally fixed component and of the further component, and can communicate in the axial direction with an oil collecting region. Thus, the oil flowing circumferentially around the rotationally fixed component can be caught and accumulated in the lower region of the further component and guided from there in the direction of the oil collecting region.

In this context, the oil collecting region can be an oil sump of a transmission or a region within a bearing chamber, for example.

If a depth of the catcher region rises in the axial direction, at least in some region or regions, starting from a region of the catcher region remote from the space, towards a region of the catcher region adjacent to the space, the oil downstream of the groove of the rotationally fixed component is discharged from the region between the two components and guided in the direction of an oil collecting region purely on the basis of the effective gravitational force, even when the momentum of the oil is low.

A sealing unit, in particular an O ring, can be provided between the rotationally fixed component and the further component in order, in a manner which is simple in terms of design, to avoid oil escaping between the rotationally fixed component and the further component out of the space.

If the rotationally fixed component is produced using carbon, additional lubrication in the region between the sealing surfaces of the rotatable component and the rotationally fixed component is not required by virtue of the properties of the rotationally fixed component, which is then self-lubricating.

The further component can be of rotationally fixed design and can contribute at least in part to the delimitation of the space.

There is furthermore the possibility that the oil is introduced into the channel via a pressure line. This enables the oil volume flow with which the rotationally fixed component is supplied in the region of its groove to be subjected to open-loop and/or closed-loop control in a simple manner.

If, in addition to the pressure line, the channel is in operative connection directly with the space or, alternatively directly with the space without a pressure line, and if the oil is passed out of the space into the groove of the rotationally fixed component via the channel, the rotationally fixed component is supplied with oil from the space without additional outlay in terms of open-loop and closed-loop control.

Furthermore, a gas turbine engine, in particular a gas turbine engine of an aircraft, having a device as described in greater detail above is proposed in order to avoid unwanted operating temperatures in the region of sealing arrangements in a manner which is simple in terms of design.

The further component can be a casing part of the gas turbine engine which delimits a bearing chamber or an internal space of a transmission, such as an auxiliary equipment transmission. A discharge of oil from the bearing chamber or from an internal space of a transmission can then be achieved in a simple manner, even in the case of high relative rotary motions between the rotationally fixed component and the rotatable component, without at the same time producing undesirably high operating temperatures in the region of the sealing surfaces of the rotationally fixed component and the rotatable component.

The rotatable component can be a shaft or a component in operative connection therewith.

It is self-evident to a person skilled in the art that a feature described in relation to one of the above aspects may be applied to any other aspect, unless these are mutually exclusive. Furthermore, any feature described here may be applied to any aspect and/or combined with any other feature described here, unless these are mutually exclusive.

An embodiment will now be described, by way of example, with reference to the figures.

in which.

Figure 1:
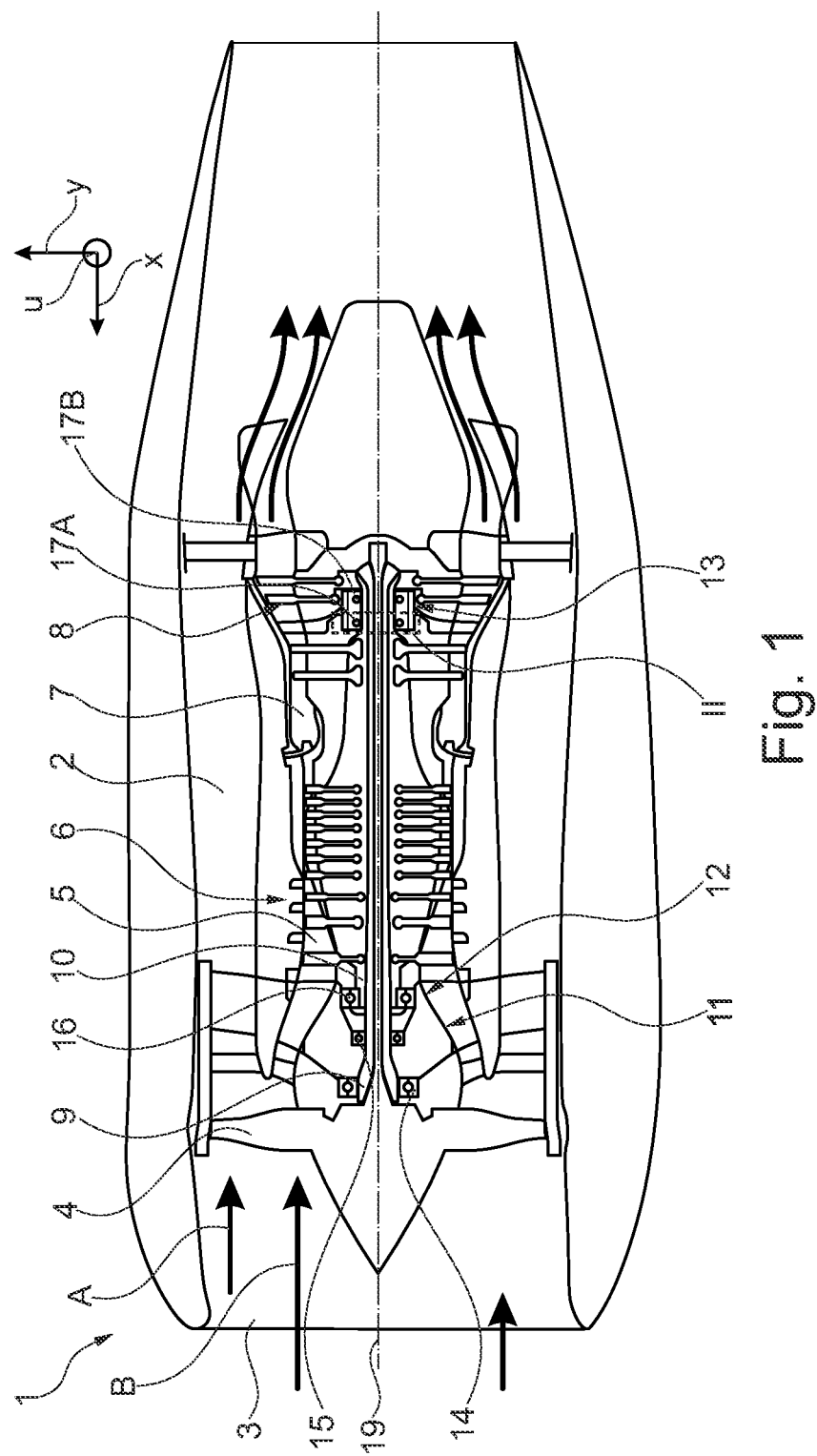
FIG. 1 shows a highly schematized longitudinal sectional view of a gas turbine engine.

FIG. 1 shows a gas turbine engine 1, preferably a gas turbine engine for an aircraft, in a schematized longitudinal sectional view. The gas turbine engine 1 is designed with a bypass channel 2 and an inlet region 3. Downstream of the inlet region 3 there is an adjoining fan 4 in a manner known per se. Downstream of the fan 4, the fluid flow is divided in the gas turbine engine 1 into a bypass flow A and a core flow B. The bypass flow A flows through the bypass channel 2, while the core flow B flows into an engine core 5. The engine core 5 is fitted in a manner known per se with a compressor device 6, a burner 7 and a turbine device 8.

The gas turbine engine 1 in the present case has two shafts, a first shaft 9 and a second shaft 10. The first shaft 9 represents a "low-pressure shaft", while the second shaft 10 represents a high-pressure shaft of the gas turbine engine 1. The low-pressure shaft 9 and the high-pressure shaft 10 are each mounted so as to be rotatable about a central axis or center line 19. The low-pressure shaft 9 is connected to the fan 4 for conjoint rotation, and during operation of the gas turbine engine 1 rotates about the central axis 19 with a lower speed of rotation than the high-pressure shaft 10. For mounting the shafts 9, 10 together and relative to a casing 11 of the gas turbine engine 1, a plurality of bearings 14, 15, 16, 17A, 17B is provided. The bearings 14, 15, 16, which are each embodied as rolling bearings, are in the present case arranged in a bearing chamber 12 which is at the front in the axial direction X of the gas turbine engine 1, while the bearings 17A and 17B, which are likewise embodied as rolling bearings, are mounted in a bearing chamber 13 which is at the rear in the axial direction X of the gas turbine engine 1.

Figure 2:
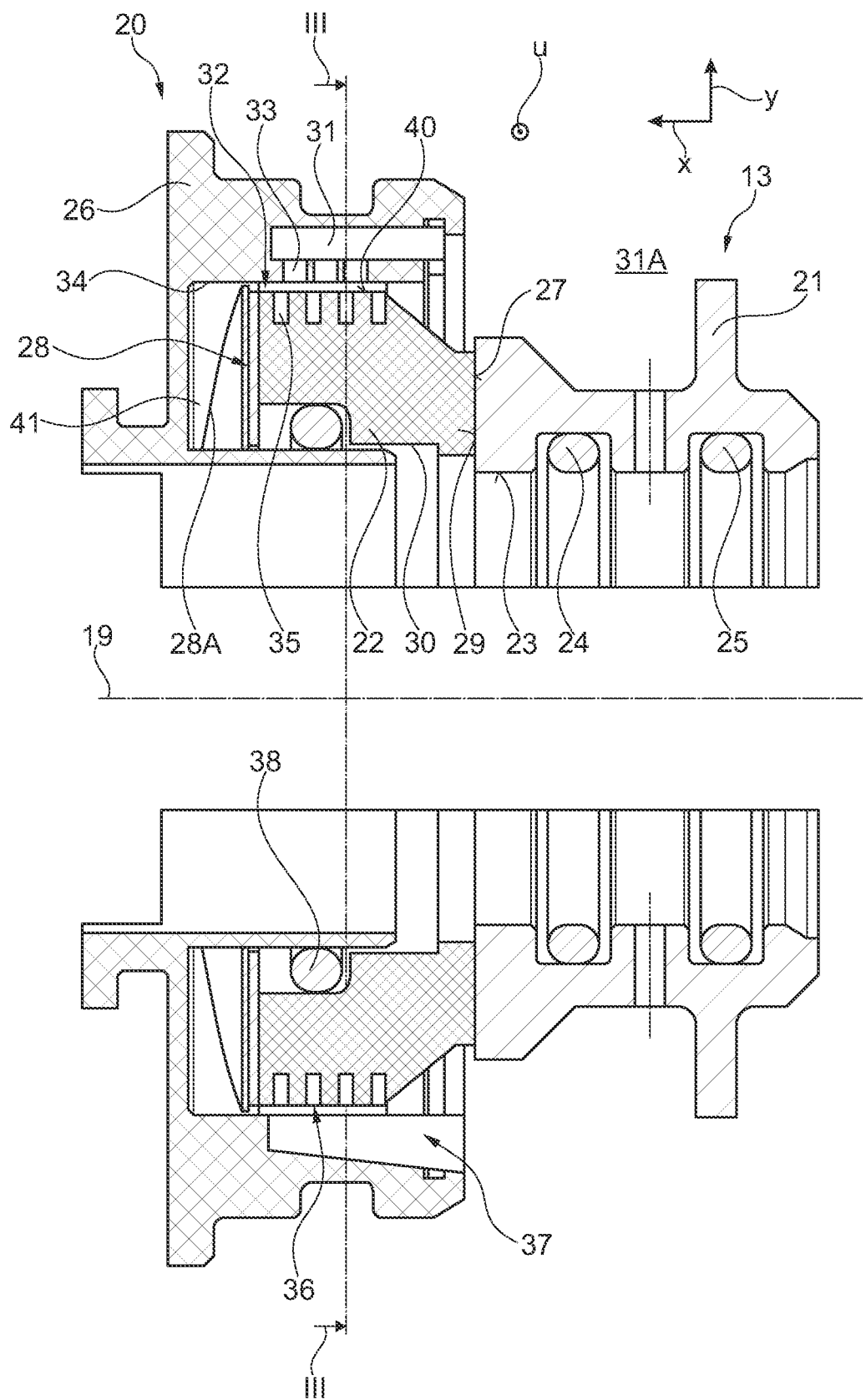
FIG. 2 shows an enlarged partially sectioned view of a region II, marked in more detail in FIG. 1.

FIG. 2 shows an enlarged partial sectional view of a region II indicated more specifically in FIG. 1, which includes part of the rear bearing chamber 13. Here, FIG. 2 shows a device 20 in the installed position or during horizontal flight of an aircraft constructed with the gas turbine engine 1. By means of the device 20, sealing of the rear bearing chamber 13 is made available between a rotating component 21 and a rotationally fixed component 22. The rotatable component 21 is connected rotatably in a manner not shown specifically to the low-pressure shaft 9, wherein two O rings 24, 25 are provided for the purpose of sealing between an inner side 23 of the rotatable component 21 and an outer side of the low-pressure shaft 9.

In the present case, the rotationally fixed component 22 is embodied as a hollow-cylindrical annular body is produced using carbon. In the operating state of the gas turbine engine 1 illustrated in FIG. 2, a sealing surface or axial end face 27 of the rotationally fixed component 22, which component is arranged in such a way that it can be moved axially or longitudinally in a groove 41 of a further rotationally fixed component 26, is pressed against a sealing surface or axial end face 29 of the rotatable component 21 by at least one spring element 28A of a spring device 28. This operating state of the gas turbine engine 1 is distinguished by a speed of rotation of the low-pressure shaft 9 and hence of the rotatable component 21 which is lower than a threshold speed of rotation.

If the speed of rotation of the rotatable component 21 is higher than the threshold speed of rotation, means provided in the region of the end faces 27 and 29 cause air to be drawn in. Starting from the inner side 30 of the rotatable component 21, the air is in this case guided by the means between the two end faces 27 and 29 and in the direction of an internal space 31A of the rear bearing chamber 13. This air volume flow has the effect that the rotatable component 21 is acted upon by a further actuating force, which counteracts the spring force of the spring device 28 in the axial direction X.

The means in the region of the end faces 27 and 29 can be embodied as spiral grooves, for example. In this case, the spiral grooves are designed to build up a pressure field between the end faces 27 and 29 at speeds of rotation of the rotatable component 21 above the threshold speed of rotation. The pressure field results in the further actuating force, which moves end face 27 away from end face 29 counter to the spring force of the spring device 28 at speeds of rotation of the rotatable component 21 higher than the threshold speed of rotation. This means that the further actuating force due to the air volume flow pushes the rotationally fixed component 22 away from the rotatable component 21 in an axial direction when the further actuating force due to the volume flow exceeds the spring force of the spring device 28. As a result, the operative connection between the rotatable component 21 and the rotationally fixed component 22 is canceled, but without impairing the sealing effect.

In addition, the pressure field has the effect that sufficient air flows out of the region radially to the inside of the inner side 30 of the rotationally fixed component 22 and radially to the inside of the further rotationally fixed component 26, between the two end faces 27 and 29, and from there into the internal space 31A of the rear bearing chamber 13.

If the two end faces 27, 29 come into contact with one another during the operation of the gas turbine engine 1, despite a speed of rotation of the rotatable component 21 being higher than the threshold speed of rotation, the heat which is generated by the sliding frictional contact between the end faces 27 and 29 is dissipated in the manner described more specifically below by oil cooling of the rotationally fixed component 22.

For the oil cooling of the rotationally fixed component 22, the further rotationally fixed component 26 is embodied with a channel 31. In the installed position of the further rotationally fixed component 26, the channel 31 is provided above an upper region 32 of the rotationally fixed component 22 in the radial direction Y and extends in the further rotationally fixed component 26 in the axial direction X of the gas turbine engine 1. In addition, the channel 31 is embodied as a blind hole and opens into the internal space 31A of the rear bearing chamber 13.

A plurality of tap holes 33 are operatively connected at one end to the channel 31 and, at the other end, emerge in the region of an inner side 34 of the further rotationally fixed component 26, above the rotationally fixed component 22. The rotationally fixed component 22 is designed with a plurality of grooves 35, which extend over the entire outer circumference of the rotationally fixed component 22 and are produced in an outer side 40 of the rotationally fixed component 22 by means of milling or the like. The grooves 35 and the tap holes 33 are in at least partial overlap with one another, both in the circumferential direction U and in the axial direction X. The oil which enters the channel 31 from the internal space 31A of the rear bearing chamber 13 can thus be introduced into the grooves 35 from the channel 31 via the tap holes 33 purely by the gravitational force acting on the oil.

Figure 3:
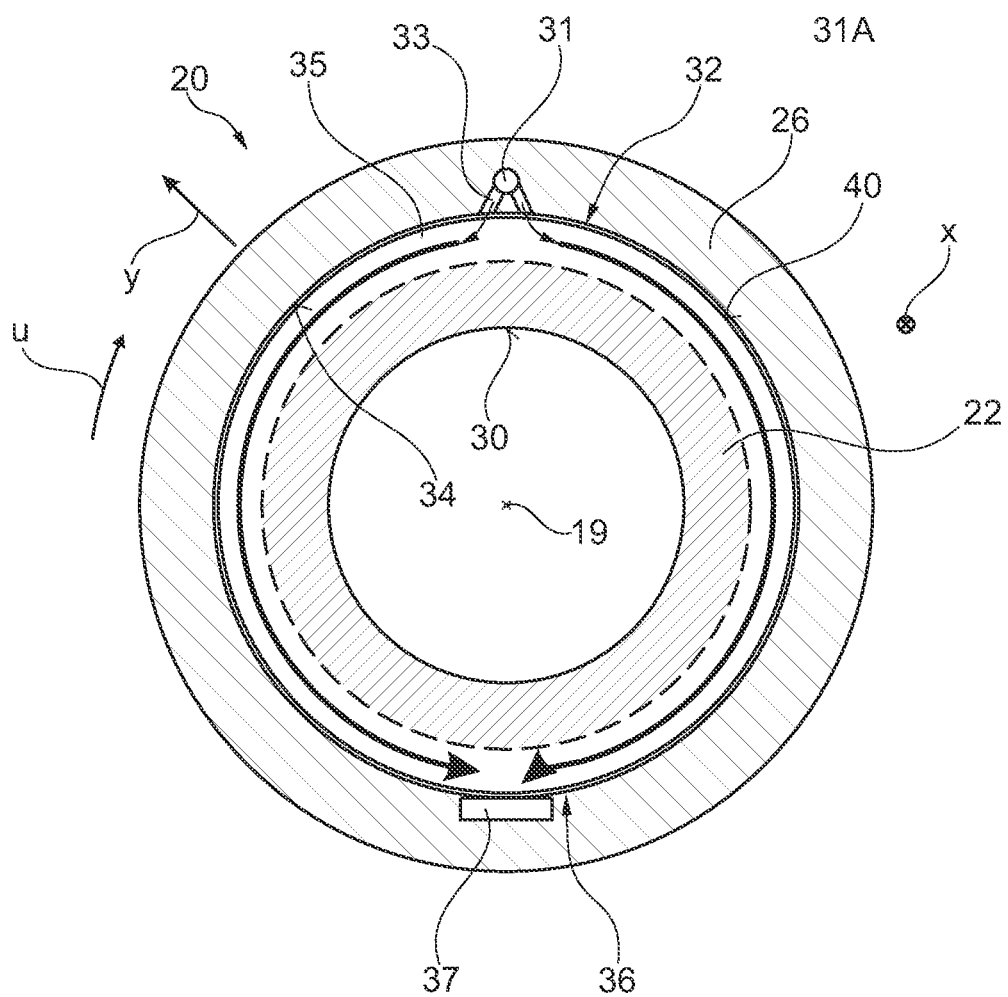
FIG. 3 shows a cross-sectional view along a section line III-III of the region shown in FIG. 2.

From the upper region 32 of the rotationally fixed component 22, the oil then flows in the grooves 35 in the circumferential direction U of the rotationally fixed component 22, toward a lower region 36 of the rotationally fixed component 22, in the manner illustrated more specifically in FIG. 3. There, the oil emerges downward from the grooves 35 in the direction of an upwardly open catcher region 37 of the further rotationally fixed component 26, owing to the gravitational force. The catcher region 37 has a wedge-shaped cross section in the axial direction X. As a result, the oil which is caught is guided from the catcher region 37 into the internal space 31A of the bearing chamber 13 without further effort, even during various flying attitudes of an aircraft that deviate from horizontal flight.

To avoid oil escaping from a radial region between the rotationally fixed component 22 and the further rotationally fixed component 26, a further O ring 38 is provided between these components.

LIST OF REFERENCE SIGNS

1 Gas turbine engine
2 Bypass flow channel
3 Inlet region
4 Blower
5 Engine core
6 Compressor device
7 Burner
8 Turbine device
9 First shaft, low-pressure shaft
10 Second shaft, high-pressure shaft
11 Casing
12 Front bearing chamber
13 Rear bearing chamber
14 Bearing
15 Bearing
16 Bearing
17A Bearing
17B Bearing
19 Central axis, center line
20 Device
21 Rotatable component
22 Rotationally fixed component
23 Inner side of the rotatable component 21
24, 25 O ring
26 Further rotationally fixed component
27 Sealing or end face of the rotationally fixed component 22
28 Spring device
28A Spring element
29 Sealing or end face of the rotatable component 21
30 Inner side of the rotationally fixed component 22
31 Channel
31A Internal space of the rear bearing chamber
32 Upper region of the rotationally fixed component 22
33 Tap hole
34 Inner side of the further rotationally fixed component
35 Groove
36 Lower region of the rotationally fixed component 22
37 Catcher region of the further rotationally fixed component 26
38 O ring
40 Outer side of the rotationally fixed component
41 Groove of the further rotationally fixed component
A Bypass flow
B Core flow
U Circumferential direction
X Axial direction
Y Radial direction

The invention claimed is:

1. A device having at least two components, which, at least in some region or regions, delimit a space in which oil is present,
wherein a rotatable component of the at least two components is embodied to be rotatable relative to a rotationally fixed component of the at least two components,
wherein the rotationally fixed component is movable axially relative to the rotatable component and is subjected to an axial actuating force which acts on the rotationally fixed component, acting in a direction of the rotatable component,
wherein the rotationally fixed component includes a first axial sealing surface pressed against a second axial sealing surface of the rotatable component in an axial direction by the axial actuating force to seal a space in a region of the first and second axial sealing surfaces,
wherein at least one chosen from the rotationally fixed component and the rotatable component includes, in the region of the first and second axial sealing surfaces, an air flow source which, during a rotary motion of the rotatable component relative to the rotationally fixed component, produces an air flow which flows out of an environment of the at least two components and between the first and second axial sealing surfaces in a direction of the space,
wherein the air flow results in a further actuating force, which acts on the rotationally fixed component in the axial direction to counteract the axial actuating force and move the rotationally fixed component away from the rotatable component in the axial direction once a defined speed of rotation of the rotatable component has been reached,
wherein at least one chosen from the rotatable component and the rotationally fixed component is supplied with oil close to the first and second axial sealing surfaces,
and wherein, in an installed position of the rotationally fixed component, the oil is passed from an upper region of the rotationally fixed component in a circumferential direction of the rotationally fixed component in a direction of a lower region of the rotationally fixed component;
wherein the rotationally fixed component is a hollow-cylindrical component having, on an outer side thereof, at least one groove extending in the circumferential direction, through which the oil is passed from the upper region of the rotationally fixed component in the direction of the lower region;
wherein the rotationally fixed component is axially movable in a groove of a further component, and the oil is passed through the further component into the at least one groove of the rotationally fixed component;
a channel in the further component through which the oil is passed into the groove of the rotationally fixed component;
wherein the oil is introduced into the channel via a pressure line, and/or the channel is in operative connection with the space, and the oil is passed out of the space into the groove of the rotationally fixed component via the channel.

2. The device according to claim 1, and further comprising a spring device providing a spring force which acts as, the actuating force, the spring device being arranged in the groove of the further component and comprising at least one spring element, with one end of the at least one spring element being positioned against a shoulder on the rotationally fixed component and another end of the at least one spring element being positioned against a shoulder on the further component.

3. The device according to claim 1, and further comprising a tap hole in the further component, the tap hole opening on an inner side of the further component, wherein the channel in the further component extends in the axial direction of the rotatable component, and is in operative connection with the tap hole, wherein a mouth of the tap hole is arranged above the groove of the rotationally fixed component in the installed position of the further component.

4. The device according to claim 1, wherein the further component includes, below the groove of the rotationally fixed component, a catcher region communicating in the axial direction with an oil collecting region.

5. The device according to claim 4, wherein a depth of the catcher region rises in the axial direction, at least in some region or regions, starting from a region of the catcher region remote from the space, towards a region of the catcher region adjacent to the space.

6. The device according to claim 1, and further comprising, a sealing unit positioned between the rotationally fixed component and the further component.

7. The device according to claim 1, wherein the rotationally fixed component has a carbon composition.

8. The device according to claim 1, wherein the further component is rotationally fixed and at least partially delimits the space.

9. A gas turbine engine, having a device according to claim 1.

10. The gas turbine engine according to claim 9, wherein the further component is a casing part which delimits a bearing chamber or an internal space of a transmission.

11. The gas turbine engine according to claim 9, wherein the rotatable component is a shaft or a component in operative connection therewith.

12. A device having at least two components, which, at least in some region or regions, delimit a space in which oil is present,
wherein a rotatable component of the at least two components is embodied to be rotatable relative to a rotationally fixed component of the at least two components,
wherein the rotationally fixed component is movable axially relative to the rotatable component and is subjected to an axial actuating force which acts on the rotationally fixed component, acting in a direction of the rotatable component,
wherein the rotationally fixed component includes a first axial sealing surface pressed against a second axial sealing surface of the rotatable component in an axial direction by the axial actuating force to seal a space in a region of the first and second axial sealing surfaces,
wherein at least one chosen from the rotationally fixed component and the rotatable component includes, in the region of the first and second axial sealing surfaces, an air flow source which, during a rotary motion of the rotatable component relative to the rotationally fixed component, produces an air flow which flows out of an environment of the at least two components and between the first and second axial sealing surfaces in a direction of the space,
wherein the air flow results in a further actuating force, which acts on the rotationally fixed component in the axial direction to counteract the axial actuating force and move the rotationally fixed component away from the rotatable component in the axial direction once a defined speed of rotation of the rotatable component has been reached,
wherein at least one chosen from the rotatable component and the rotationally fixed component is supplied with oil close to the first and second axial sealing surfaces,
and wherein, in an installed position of the rotationally fixed component, the oil is passed from an upper region of the rotationally fixed component in a circumferential direction of the rotationally fixed component in a direction of a lower region of the rotationally fixed component;
wherein the rotationally fixed component is a hollow-cylindrical component having, on an outer side thereof, at least one groove extending in the circumferential direction, through which the oil is passed from the upper region of the rotationally fixed component in the direction of the lower region;
wherein the rotationally fixed component is axially movable in a groove of a further component, and the oil is passed through the further component into the at least one groove of the rotationally fixed component;
a channel in the further component through which the oil is passed into the groove of the rotationally fixed component;
a tap hole in the further component, the tap hole opening on an inner side of the further component, wherein the channel in the further component extends in the axial direction of the rotatable component, and is in operative connection with the tap hole, wherein a mouth of the tap hole is arranged above the groove of the rotationally fixed component in the installed position of the further component.

* * * * *